United States Patent [19]

Jorgensen et al.

[11] Patent Number: 5,665,939

[45] Date of Patent: Sep. 9, 1997

[54] METHOD AND QUICK-DISCONNECT APPARATUS FOR A THREE-PHASE MOTOR

[75] Inventors: Glenn F. Jorgensen, Ridgewood, N.J.; Michael W. Kelly, Joliet, Ill.

[73] Assignees: Power House Tool, Inc., Joliet, Ill.; JNT Technical Services, Inc., Little Ferry, N.J.

[21] Appl. No.: 336,099

[22] Filed: Nov. 4, 1994

[51] Int. Cl.[6] .................................................. H02G 3/18
[52] U.S. Cl. .................. 174/50.52; 174/59; 439/535
[58] Field of Search .................... 174/50, 50.52, 174/50.56, 53, 58, 59, 60, 62; 439/535

[56] References Cited

U.S. PATENT DOCUMENTS

| | | | |
|---|---|---|---|
| 3,619,641 | 11/1971 | Ballard | 307/149 |
| 4,754,179 | 6/1988 | Capuano et al. | 174/50 X |
| 4,782,244 | 11/1988 | Wakimoto | 307/116 |
| 5,349,983 | 9/1994 | Ozarowski et al. | 137/487.5 |

*Primary Examiner*—Kristine L. Kincaid
*Assistant Examiner*—Dean A. Reichard
*Attorney, Agent, or Firm*—Hill, Steadman & Simpson

[57] ABSTRACT

The present invention provides a method and quick-disconnect apparatus for disconnecting power to a three-phase motor. The present invention provides a quick-disconnect apparatus for efficiently and easily disconnecting three-phase power to a motor having a receptacle terminal box with a first plurality of quick-disconnect receptacles, a second plurality, half of the first plurality in number, of bus bars connecting pairs of the quick-disconnect receptacles, and the second plurality of power cables individually connected to the bus bars for providing current to the three-phase motor.

12 Claims, 1 Drawing Sheet

U.S. Patent      Sep. 9, 1997      5,665,939
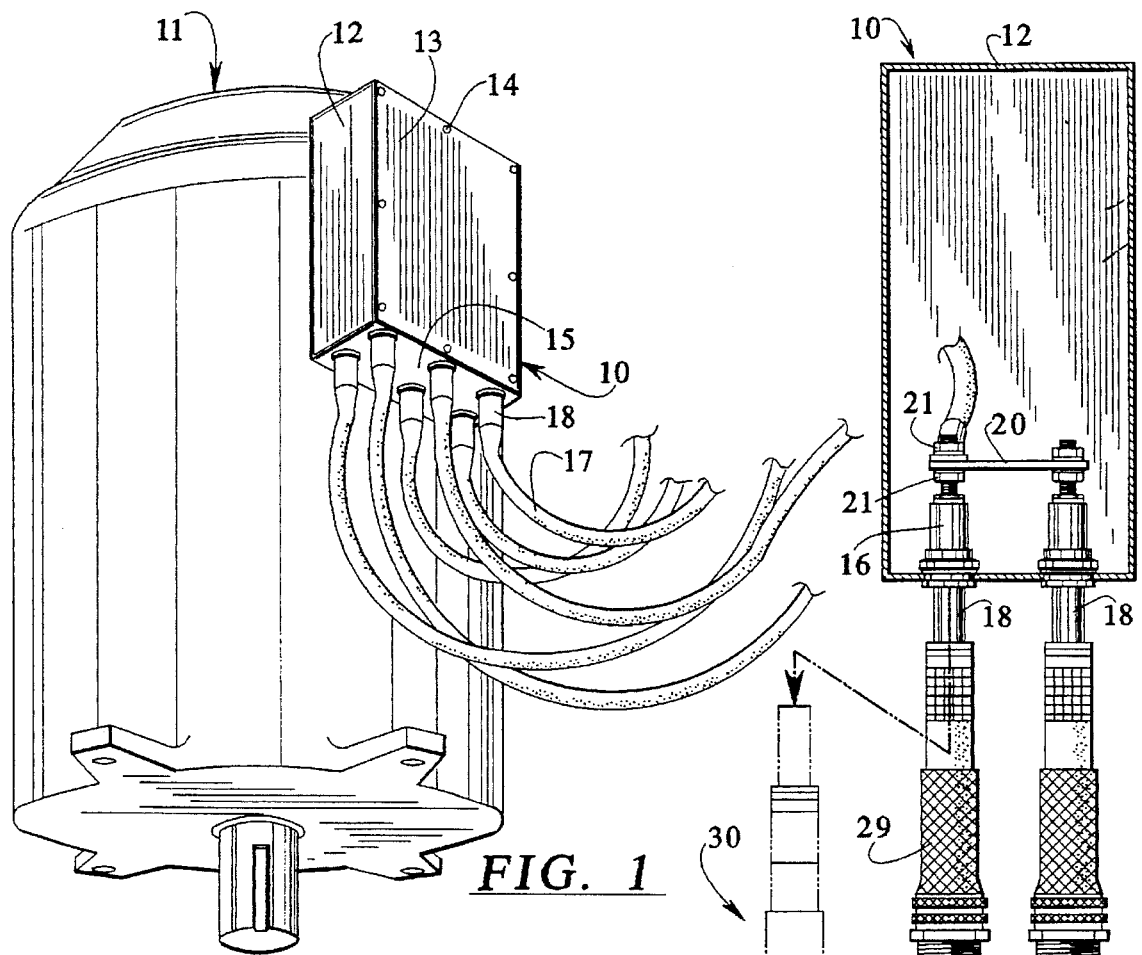
FIG. 1
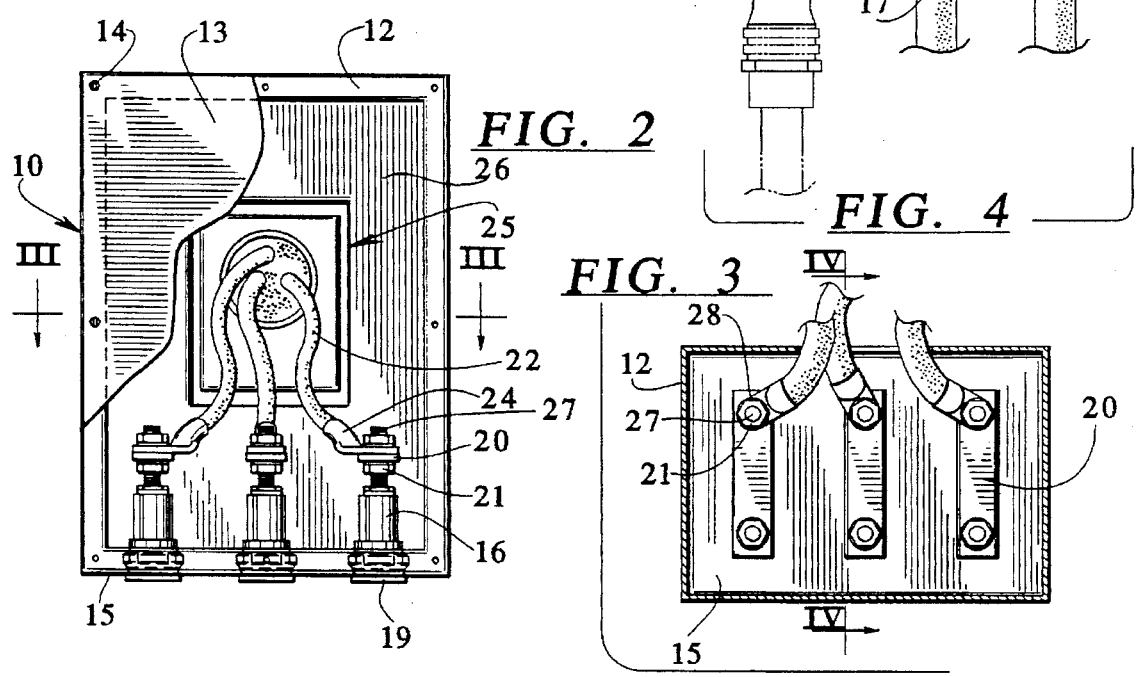
FIG. 2
FIG. 3
FIG. 4

METHOD AND QUICK-DISCONNECT APPARATUS FOR A THREE-PHASE MOTOR

BACKGROUND OF THE INVENTION

The present invention is directed generally to a three-phase motor and, more specifically, to a method and a quick-disconnect apparatus for disconnecting and reconnecting power to a three-phase motor.

Much of today's heavy duty machinery requires three-phase power. Examples include motor-driven pumps, motors and generators in power plants, refineries and steel mills. In addition, the cables necessary for providing adequate power to the machinery must be extremely large to accommodate the massive currents used in some of the three-phase motors. As a result, many three-phase motors used to operate heavy duty machinery require a number of very bulky, large and inflexible cables.

Several problems are known when dealing with such a large number Of missive power cables in a large heavy industry plant especially when several three-phase motors are in use. For example, large cable trays are used to guide the cables between pieces of equipment and the main power supply for the equipment in the plaint. While these cable trays are able to keep a large number of power cables neatly organized from the power supply to the individual motors and other pieces of equipment using three-phase power, other problems are commonplace.

For example, it is a known problem at the actual motor itself, where the cables leave the cable tray and are loose, to provide an acceptable solution for organizing and connecting the cables. The large cables are bulky and less flexible and as a result cause difficulties in organizing and connecting the cables at the three-phase motor. In addition, to complicate matters, some heavy duty motors require very large currents that are beyond the capability of the standard power cables. Thus, in these instances, a particular motor will require a parallel feed of three-phase power. Thus, the number of power cables is at least doubled to provide the adequate current needed for the three-phase motor.

In addition, some of these motors can be as large as a tanker trailer on a semi and have horsepower ratings of several thousand horsepower. As a result, typically many heavy-duty motors require connections to several bulky power cables at a junction box for the motor. These cables are often spliced together (known as "bugging") with heavy-duty rubber tape and PVC tape. However, these spliced cables form an unwieldy bundle at the motor that is difficult to work with and cumbersome to disconnect (i.e., "un-bug"). For example, if a motor needs to be replaced, a time consuming disconnection of the spliced together massive power cables ("un-bugging"and "re-bugging") greatly increases the time needed to replace the motor. For example, a typical "un-bugging" procedure requires a full shift for two skilled workers. In addition, a typical "re-bugging" procedure requires a shift and a half for two workers.

Thus, a method and apparatus for providing quick-disconnects for efficiently and neatly disconnecting power to a three-phase motor (un-bugging and re-bugging) is needed in the field of heavy industry.

SUMMARY OF THE INVENTION

Accordingly, it is an object of the present invention to provide a method and apparatus for quick-disconnecting power to a three-phase motor (un-bugging and re-bugging) requiring greatly reduced effort and time.

The present invention provides a method and quick-disconnect apparatus for disconnecting and reconnecting power to a three-phase motor. The method provides for quickly disconnecting the power to a three-phase motor without using extraneous tools. The method has steps of providing a power junction box with a plurality of electrical receptacles and a plurality of power cables connected to the receptacles. For example, three power cables are connected at one end to a bus bar. The bus bar is connected to the power cables of the receptacles, and the other end of the three power cables is connected to the three-phase motor itself.

The present invention also provides a quick-disconnect apparatus for a three-phase motor having a receptacle terminal box with a first plurality of quick-disconnect receptacles. The apparatus also has a second plurality (half of the first plurality) of bus bars for connecting pairs of the quick-disconnect receptacles to each other. Also, the quick-disconnect apparatus provides a plurality of power cables individually connected to the bus bars for providing current to the motor.

The present invention provides, in an embodiment, a quick disconnect apparatus for a high voltage, high current three phase motor, to be positioned between electrical motor power cables connected to the motor for supplying electrical power thereto and electrical power cables connected to a source of electricity, having a junction box having at least one exposed wall, a plurality of quick disconnect connectors; one half of each of the connectors being mounted through the exposed wall of the junction box so as to be accessible from both an interior and an exterior of the junction box and a second half of each of the connectors being mounted on an end of each of the electrical power cables, and means for mechanically connecting each of the motor power cables from the motor to an appropriate one of the quick disconnect receptacles within the junction box.

BRIEF DESCRIPTION OF THE DRAWINGS

FIG. 1 illustrates a quick-disconnect apparatus for a three-phase motor of the present invention mounted to a motor.

FIG. 2 illustrates a front cut-away view of the present invention.

FIG. 3 illustrates a top section view taken along line III—III of FIG. 2 of the present invention.

FIG. 4 illustrates a side sectional view taken along line IV—IV of FIG. 3 of the present invention.

DETAILED DESCRIPTION OF THE PREFERRED EMBODIMENTS

Referring now to the figures, FIG.1 illustrates a quick-disconnect for a apparatus for a three-phase motor of the present invention. The quick-disconnect apparatus 10 is shown mounted to a three-phase motor 11. The type of motor contemplated to be used with the present invention ranges from 480 volts to 550 volts, all the way to 5 kilovolts and up. The motors can be three-phase with delta connections. The electrical currents involved in the motors of this size can be up to 1000 amperes. As illustrated, the quick-disconnected apparatus 10 has a junction box 12 with a cover 13. The cover 13 is affixed to the junction box 12 for example, by screws 14. The junction box 12 has a connector panel 15 having a plurality of quick-disconnect receptacles 16 (see FIG. 2). Connected to these receptacles 16 are a plurality of power cables 17. The power cables 17 have quick-disconnect plugs 18 at one end for connecting to the quick-disconnect receptacles 16 of the present invention. The quick-disconnect plugs 18 are of the type commonly used in temporary situations for welding, lighting and related uses. The other ends of the power cables 17 are usually routed through cable trays (not shown) to the supply of electrical power. Typical sizes for the power cables contemplated for use with the present invention are 500/750/1000 Thousand Circular Mils, (MCM). These cables have diameters on the order of one and a half inches and larger.

Referring now to FIG. 2, the quick-disconnect apparatus 10 is illustrated in a front cutaway view. The junction box 12 is shown with a cut-away of the cover 13 affixed by screws 14. Also illustrated in FIG. 2 are the quick-disconnect receptacles 16 shown mounted to the connector panel 15 of the quick-disconnect apparatus 10. Also illustrated is a connector end 19 of the quick-disconnect receptacle 16. At the other end of the quick-disconnect receptacle 16 is a bus bar 20 which is secured to the quick-disconnect receptacle 16 by nuts 21. The bus bar 20 electrically Connects pairs of the quick-disconnect receptacles 16.

In a preferred embodiment, six quick-disconnect receptacles 16 are provided in the quick-disconnect apparatus 10. Also, three bus bars 20 connect the six quick-disconnect receptacles 16 into three pairs. Also, illustrated in FIG. 2 are three motor power cables 22. A connector 24 is located at one end of each of the motor power cables 22. This connector 24 electrically connects to the bus bar 20 which is connecting the pair of quick-disconnect receptacles 16 and is secured thereto by the nuts 21. As illustrated, three motor power cables 22 are shown connected to the three pairs of quick-disconnect receptacles 16. The other end of each of the three motor power cables 22 connects to the three phase motor 11. In an embodiment, the three motor power cables 22 feed through an exposed wall or a cut-out 25 of a back parcel 26 of the junction box 12.

Referring now to FIG. 3, the bus bars 20 are illustrated in a sectional view taken along line III—III of FIG. 2 of the present invention. As illustrated, the bus bars 20 are secured to a threaded stud 27 of the quick-disconnect receptacle 16 by the nuts 21 and a washer 28. In the embodiment shown, three bus bars 20 are shown connecting six quick-disconnect receptacles 16 to form three pairs of quick-disconnect receptacles 16. However, more are possible to satisfy increased current draws needed for motors having greater demands.

Also, illustrated in FIG. 2, are the three motor power cables 22. These motor power cables 22 are connected via the connector 24 to the threaded stud 27 and the bus bar 20 of each pair of quick-disconnect receptacles 16. The motor power cables 22 are shown exiting the cut-out 25 of the junction box 12.

FIG. 4 illustrates a side sectional view taken along line IV—IV of FIG. 3 of the present invention. A pair of quick-disconnect receptacles 16 are shown connected via the bus bar 20 and secured by the nuts 21. Also illustrated are quick-disconnect plugs 18 which insert into the connector end 19 of the quick disconnect receptacle 16. The quick-disconnect plugs 18 are each individually connected to a power cable 17. Each power cable 17 is provided with a grasping means 29 for a user to pull on when disconnecting the plug 18 from the quick-disconnect receptacle 16 of the present invention. Once a user has separated the quick-disconnect plug 18 from the quick-disconnect receptacle 16, the power cable 17 becomes free as shown by the dashed version 30 of the power cable 17. At this point, the remaining connected power cables 17 can be similarly disconnected to replace a motor.

To operate the quick-disconnect apparatus 10; a user simply separates the power cable 17 from the quick-disconnect apparatus 10 by separating the quick-disconnect plug 18 from the quick-disconnect receptacle 16 for each power cable 17. This operation can be carried out in any number of different ways depending on the type of connectors used. For example, the present invention can be embodied using 500 MCM size E1017 Series CAM-LOK® plugs and receptacles, which require only a third of a turn to disconnect the plugs 18 from the receptacles 16.

The power cables 17 can be easily reconnected after a motor has been replaced by basically reversing the disconnecting process. In this manner, the present invention provides a quick and efficient method and apparatus for disconnecting and reconnecting power cables when a motor needs replacing, for instance.

Although the invention has been described with respect to preferred embodiments, it is not to be so limited as changes and modifications can be made therein which are within the full intended scope as defined by the appended claims.

We claim:

1. A quick-disconnect apparatus for a high voltage, high amperage three-phase motor, comprising:
    a junction box having a first plurality of quick-disconnect receptacles;
    a second plurality of bus bars electrically connecting said quick-disconnect receptacles into groups; and
    a third plurality of power cables individually connected at a first end to said motor and at a second end to said second plurality of bus bars.

2. The quick-disconnect apparatus for a three-phase motor according to claim 1, wherein said second plurality is half of said first plurality.

3. The quick-disconnect apparatus for a three-phase motor according to claim 1, wherein said third plurality is equal to said second plurality.

4. The quick-disconnect apparatus for a three-phase motor according to claim 1, wherein said junction box is further defined as having a knock-out to provide access for said third plurality of power cables to be connected to said motor.

5. A method for quick-disconnect of power to a three-phase motor, comprising the steps of:
    providing a junction box having a plurality of quick-disconnect electrical receptacles and an equal plurality of power cables having quick-disconnect plugs connected thereto, wherein three further power cables are individually connected at one end to the three-phase motor and at another end to three bus bars which connect said plurality of quick-disconnect electrical receptacles in groups; and
    disconnecting said plurality of power cables from said plurality of electrical receptacles by manually operating said quick-disconnect plugs to separate same.

6. A quick-disconnect apparatus for a high voltage, high amperage three phase motor, comprising:
    a junction box having a first plurality of quick-disconnect receiving means, each for a quick-disconnect plug, said quick-disconnect receiving means being capable of handling cabling ranging in size from at least 500 Thousand Circular Mils (MCM) to 1000 MCM;
    a second plurality of bus bars electrically connecting said quick-disconnect receiving means into groups; and
    a third plurality of power cables ranging in size from at least 500 MCM to 1000 MCM and having a current capability of up to 1000 amperes and a voltage handling capability ranging from at least 480 to 5000 volts individually connected at a first end to said motor and at a second end to said second plurality of bus bars.

7. A quick-disconnect apparatus for a high voltage, high current three phase motor, to be positioned between electrical motor power cables connected to said motor for supplying electrical power thereto and electrical power cables connected to a source of electricity, comprising:

a junction box having at least one exposed wall;

a plurality of quick disconnect connectors, one half of each of said connectors being mounted through said exposed wall of said junction box so as to be accessible from both an interior and an exterior of said junction box and a second half of each of said connectors being mounted on an end of each of the electrical power cables;

means for mechanically connecting each of the motor power cables from the motor to an appropriate one of said quick disconnect connectors within said junction box; and a plurality of bus bars connecting selected ones of said quick disconnect connector halves mounted through said exposed wall of said junction box into groups.

8. A quick-disconnect apparatus according to claim 7, wherein said quick disconnect connectors are sized to accept said electrical power cables having a minimum size of at least 500 Thousand Circular Mils (MCM).

9. A quick-disconnect apparatus according to claim 7, wherein said one half is a female half and said second half is a male half.

10. A quick disconnect apparatus according to claim 7, wherein said means for mechanically connecting said motor power cables to said quick disconnect connectors comprises a threaded stud on said connectors, a bar, with an aperture therethrough, secured to an end of each of said electrical power cables, said aperture sized to receive said stud therethrough, and a nut to be threadingly received on said stud to clamp said bar onto said stud.

11. A quick disconnect apparatus according to claim 10, wherein two nuts are threaded onto said stud and said bar is clamped between said two nuts.

12. A quick-disconnect apparatus according to claim 7, wherein said plurality of quick disconnect connectors is six quick disconnect connectors, six quick disconnect connector halves are mounted through said exposed wall of said junction box, and said plurality of bus bars is three bus bars which connect said six connector halves into three groups of two connector halves.

* * * * *